July 31, 1934. V. G. APPLE 1,968,586
VEHICLE BRAKE
Original Filed Nov. 2, 1929 3 Sheets-Sheet 2
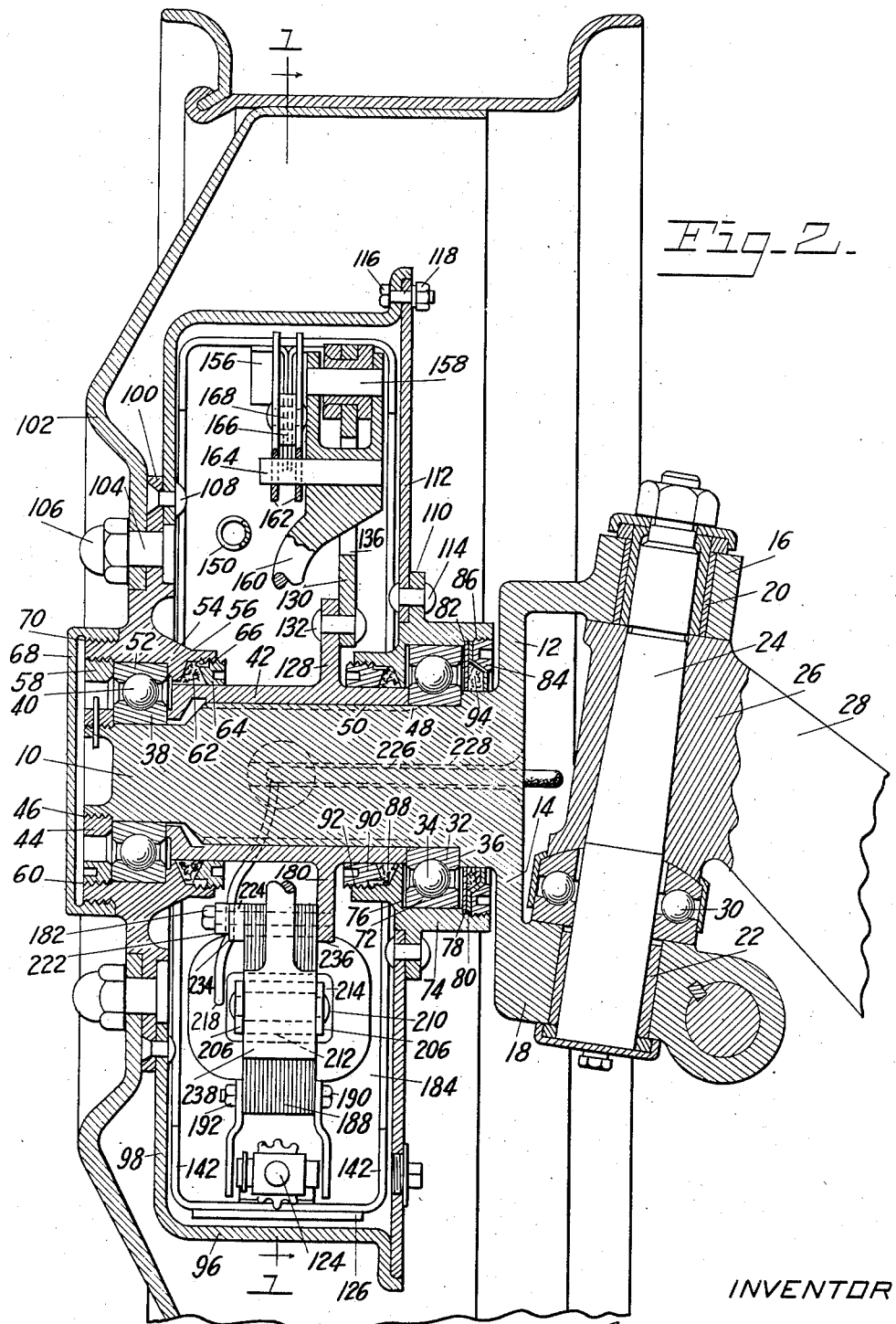
Fig_2.
INVENTOR
BY Burton & McConkey ATTORNEYS July 31, 1934.  V. G. APPLE  1,968,586
VEHICLE BRAKE
Original Filed Nov. 2, 1929   3 Sheets-Sheet 3
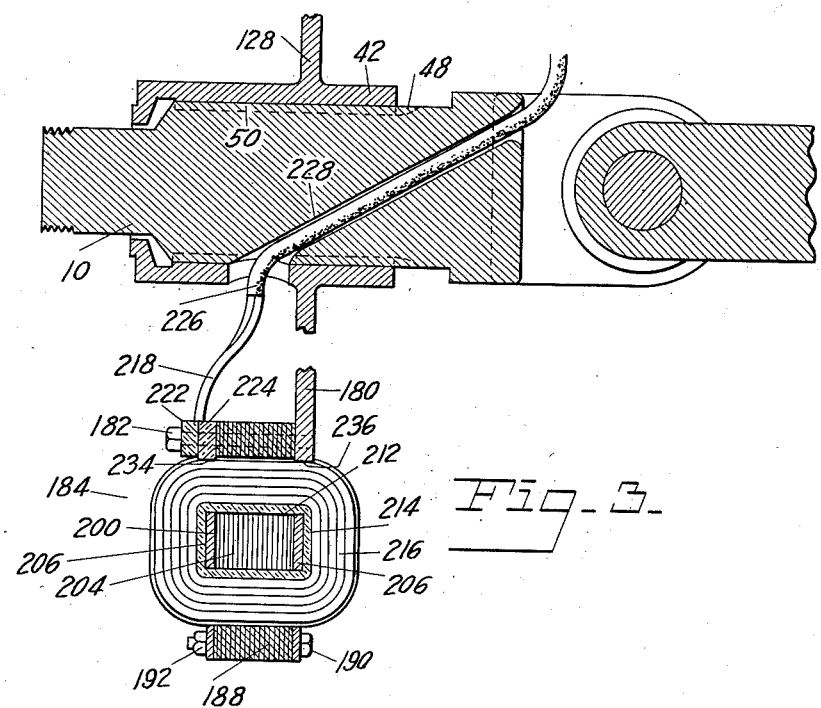
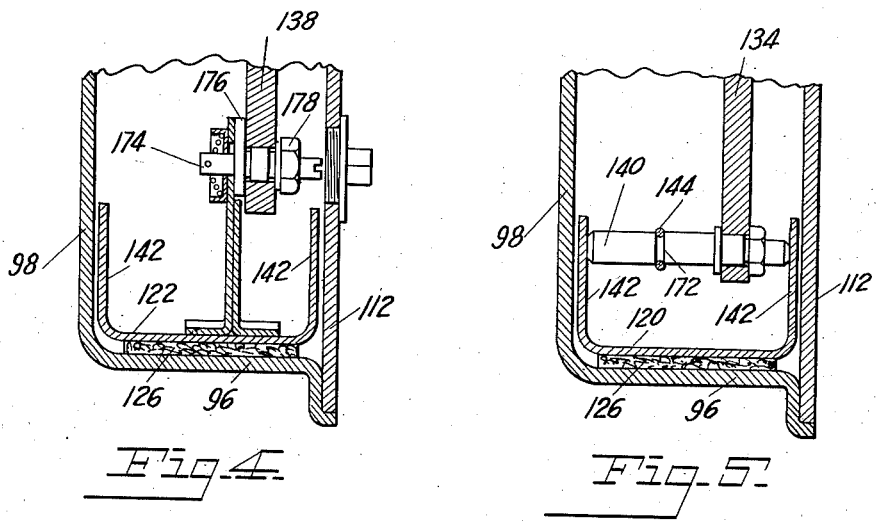
INVENTOR
BY
ATTORNEYS Patented July 31, 1934

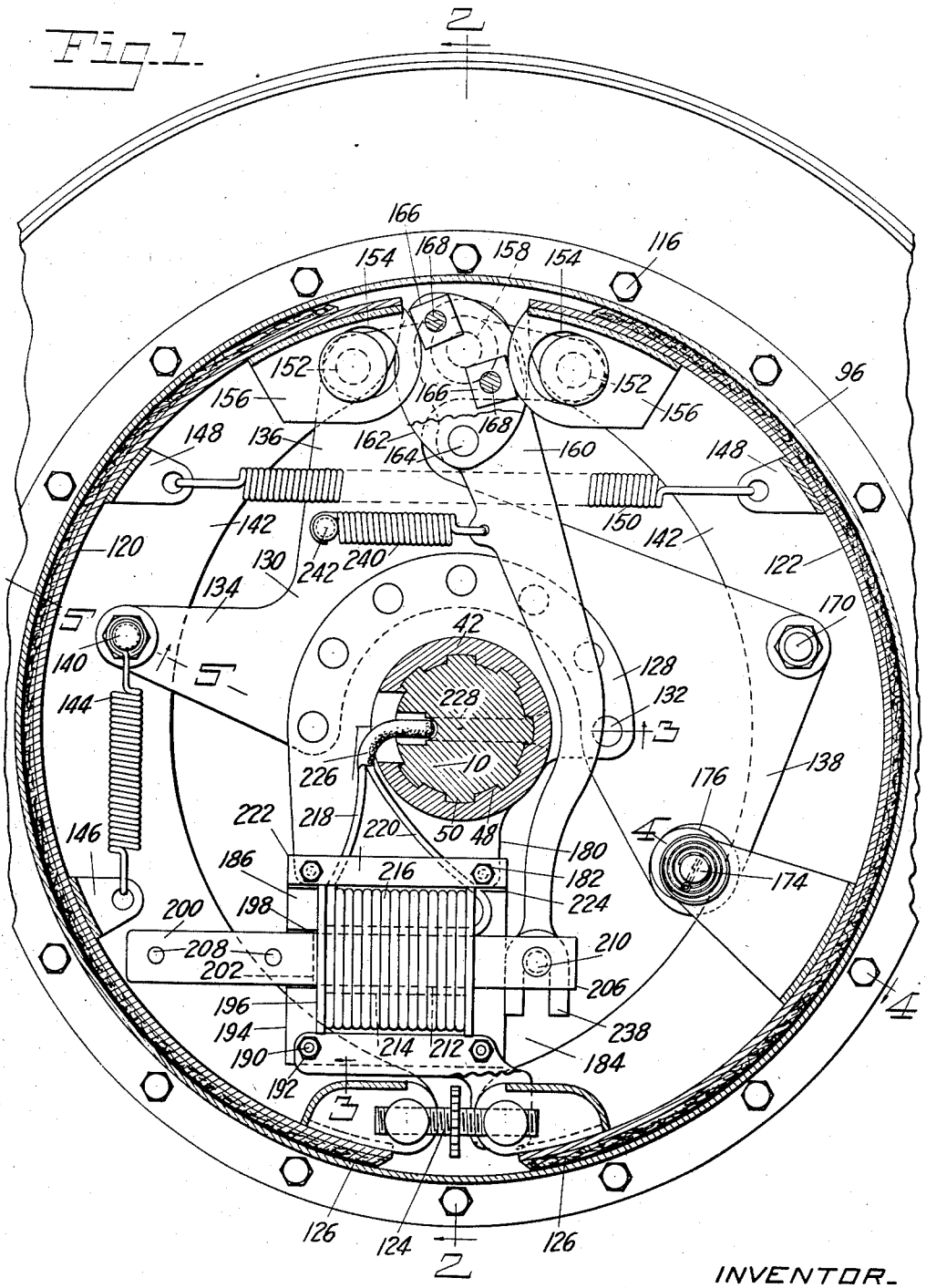

1,968,586

UNITED STATES PATENT OFFICE 1,968,586

VEHICLE BRAKE

Vincent G. Apple, Dayton, Ohio, assignor to Bendix Brake Company, South Bend, Ind., a corporation of Illinois Application November 2, 1929, Serial No. 404,236
Renewed July 15, 1933

6 Claims. (Cl. 188—163)

My invention relates to vehicle brakes for a swivelled wheel and particularly to that type of vehicle brake wherein rotatable and non-rotatable friction elements are brought together into engagement by electro-magnetic means, thereby to retard movement of the vehicle.

Another object is to provide a structure wherein a rotatable brake drum surrounds and forms a complete watertight enclosure about the non-rotatable friction means, to the end that a sufficiently high coefficient of friction may be maintained, and one that is uniform as between the friction surfaces of one wheel as compared to those of another wheel, which is not possible where water may enter the brake drums as it may those of conventional design, and which construction is similar to that disclosed in my copending applications Serial Number 404,233 and 404,240, filed Nov. 2, 1929, except that the same is adapted to a swivelled wheel.

Another object is to so shape and proportion the magnetic means which is to bring the friction elements into engagement as to adapt it to occupy certain space within the rotatable brake drum which is not taken by the non-rotatable friction means, to the end that no operative mechanical connections are required to extend from a power source outside the rotatable drum to a brake operating means within the drum.

Still another object is to so proportion and arrange the several parts as to permit a current carrying cable to enter the rotating drum without interfering with its rotative function.

Still another object is to so house the antifriction bearing at each end of the rotatable drum that the bearing lubricant may not escape into the space within the drum between the bearings which contains the brake friction members and the magnetic unit for operating them.

Further and more specific objects will become apparent as the invention is described in greater detail, reference being had to the drawings, wherein—

Fig. 1 is a transverse section, taken on the line 1—1 of Fig. 2, through an automotive front wheel and spindle, in which my improved braking mechanism is embodied.

Fig. 2 is a vertical axial section taken on the line 2—2 of Fig. 1.

Figs. 3, 4 and 5 are fragmentary sections taken on lines 3—3, 4—4 and 5—5 respectively of Fig. 1.

Similar numerals refer to similar parts throughout the several views.

In the drawings the steering knuckle comprises the usual spindle 10 having radially extending arms 12 and 14 carrying hubs 16 and 18 for bushings 20 and 22. The steering pivot pin 24 is tightly secured in the hub 26 of axle 28 and rotatably in bushings 20 and 22, with the antifriction thrust bearing 30 under hub 26 for taking the vertical steering load.

The inner race 32 of radial bearing 34 is fitted snugly to spindle 10 adjacent shoulder 36, and the inner race 38 of a somewhat smaller radial bearing 40 is similarly fitted to the outer end of the spindle. An axle member 42 spaces the inner races 32 and 38 apart and a nut 44 threaded on spindle 10 at 46 clamps the races and axle member against the shoulder 36 thus restraining them against axial movement on the spindle. Spindle 10 has a series of integral keyways 48 which engage corresponding keyways 50 in axle member 42, effectually preventing rotation of the axle member on the spindle, (see Fig. 1).

The outer race 52 of bearing 40 is snugly fitted to a bearing housing 54 and is held against shoulder 56 by a nut 58 threaded into the housing at 60. A packing ring 62 secured by nut 64 threaded into the housing at 66 holds the bearing lubricant in the housing. A hub cap 68 threaded into housing 54 at 70 closes it at the outer end.

The outer race 72 of bearing 34 is snugly fitted at its outside diameter to the bearing housing 74 but has slight axial movement therein, limited in one direction by the shoulder 76 and in the other by the washer 78. The washer 78 together with the cupped washer 80 are held against shoulder 82 by nut 84 threaded into the housing 74 at 86. A packing ring 88 secured by nut 90 threaded into housing 74 at 92 keeps the bearing lubricant from escaping at the inner end, while another packing ring 94 held between washers 78 and 80 keeps the lubricant from escaping at the outer end. The ability of housing 74 to move axially over bearing 34 takes care of inequalities in relative axial expansion between axle member 42 and the outer rim 96 of brake drum 98.

Housing 54 has an outwardly extending flange 100 to which the disc wheel 102 is held by bolts 104 and nuts 106, and to which the rotatable brake drum 98 is secured by rivets 108, while housing 74 has the smaller flange 110 to which the brake drum cover 112 is secured by rivets 114. Bolts 116 and nuts 118 hold cover 112 to drum 98 thereby forming a tight compartment within the drum, which is sealed against water from without and oil from the bearings, making a highly desirable housing for the friction elements of a brake.

The non-rotatable friction means comprises two brake shoes 120 and 122 of channel shaped cross-section joined at the lower end by the right and left adjusting screw 124, rotation of which to force the lower ends of the shoes apart is resorted to only when the brake linings 126 are worn sufficiently to require adjustment. The upper ends of the shoes are forced apart whenever braking is to be effected, and, in order that a power braking means of relatively small capacity may be employed, a cam mechanism operable by the power means supplemented by the wrap of the shoes is selected, and a lever having a relatively long power arm and correspondingly great movement at the power end is employed to operate the cam.

Ordinarily the non-rotatable members of a braking mechanism such as the shoes, the shoe operating cams and the means for holding the shoes out of engagement, are mounted on a non-rotatable plate called the backing plate, which to some extent closes the open side of the brake drum to form a housing about the braking mechanism. But since, in the present invention both sides of the drum revolve, mounting means in lieu of a backing plate is provided within the revolving drum.

The axle member 42 which is secured against rotation on spindle 10 by keyways 48 and 50 has the outwardly extending flange 128 to which a plate 130 is secured by rivets 132. Plate 130 has the arms 134, 136 and 138 extending radially outward to support the several non-rotatable members of the brake against rotation.

Arm 134 carries the stud 140 (see Fig. 5) which has the twofold purpose of keeping the webs 142 of shoe 120 from contact with the rotating elements and of holding one end of spring 144, the other end of the spring being connected to a bracket 146 welded to shoe 120. Similar brackets 148 are welded, one to each shoe, and the spring 150 connects the two brackets. The springs 144 and 150 hold the two shoes 120 and 122 so as to keep the linings 126 out of engagement with drum 98 when no braking action is desired.

Arm 136 carries the studs 152 which extend through elongated holes 154 in brackets 156 which are welded to the ends of shoes 120 and 122 and form an abutment against which spring 150 may hold the shoes when they are in the inoperative position. Arm 136 also carries the stud 158 upon which lever arm 160 fulcrums. Camming plates 162 fulcrum on stud 164 fixed in lever arm 160, and blocks 166 are rotatably supported on studs 168 riveted into the camming plates. Blocks 166 bear against the ends of the brackets 156 and force the ends of the two shoes apart when braking action is desired.

Arm 138 carries the stud 170 which is similar to stud 140 except that it does not have the spring groove 172. Stud 170 functions like stud 140 in that it side spaces the shoe 122 to prevent contact of its sides with the rotating members. Arm 138 also carries the stud 174 which has an eccentric head 176 which may be rotated by turning the stud 174 and locked with nut 178, whereby proper spacing between lining 126 and rim 96 of drum 98 is maintained in the inoperative position of the brake.

Attached to the downwardly extending arm 180 by cap screws 182 is an electro-magnetic device generally indicated by numeral 184 which comprises a field core 186 (see Fig. 1) composed of a plurality of laminæ 188 (see Fig. 2) held together by bolts 190 and nuts 192 as well as by the cap screws 182 which hold the field to the arm 180.

The field laminæ 188 are of rectangular outside outline 194 having a rectangular inner outline 196, (see Fig. 1) thus composing a continuous rectangular frame except that it is cut away at 198 to admit the armature core 200 which extends into and almost through the opening 198 to 202 when in the inoperative position.

Armature core 200 is built up of a plurality of laminæ 204 held compacted between plates 206 by rivets 208. Plates 206 are held spaced apart at their outer free ends by the spacing stud 210 and are guided in the structure by being slidably fitted to the rectangular opening 212 through a spool of insulation 214 which contains the coil 216.

The two ends 218 and 220 of the coil 216 are brought upward between two blocks 222 and 224 of insulation which are held against the heads of cap screws 182. Beyond the blocks 222 and 224 two ends are connected to a two conductor cable 226 which extends through a diagonally drilled opening 228 in the spindle 10, emerging from the spindle at a point outside the drum to be connected to a source of current supply not shown. The spool 214 is held in position in the field 186 by notches in the edge of the spool as at 234 and 236 into which the block 224 and the arm 180 extend respectively. The forked lower end 238 of lever arm 160 straddles spacing rivet 210 to operatively connect armature 200 to lever 160 through side plates 206.

Since the control forms no part of the present invention none is shown, but a control comprising means for varying the current supplied to coil 216 is preferred.

In operation current is supplied to coil 216 to energize field 186, whereupon armature core 200 is drawn through the cut-away part 198 of the field into the opening 212 of the spool, pushing plates 206 ahead of it thus operating the lever 160 to rotate the cam plates 162 to apply the brakes. The spring 240 held at one end by stud 242 and attached at the other end to lever 160 is extended when the brakes are applied, and, by contraction after the current supply is cut off, operates to release them.

From a consideration of the structure shown the reason for employing brake shoes of channel shaped cross-section is apparent, for, to admit an electromagnetic device of sufficient length, and have sufficient room left for its endwise operation, the space between the webs 142 of the brake shoes must be utilized. This may be readily done with the channel shaped shoes, but would not be so easily accomplished were the shoes of the T-shaped cross-section of conventional design where a single web 142 is located in the middle of the shoe.

Having shown and described an embodiment of the invention wherein the objects set forth are attained.

I claim:

1. Braking mechanism comprising a non-rotatable wheel spindle swivelled from the end of a non-rotatable axle, a bearing on each end of said spindle, a brake drum having both ends closed, a closed end being supported on each bearing, a flanged axle member secured against rotation between said bearings on said spindle within said enclosure, a brake shoe supporting plate secured to said flange, radially expansible brake shoes mounted on said supporting plate, and an electromagnet mounted on said axle member, said magnet having an armature operable at right angles to the axis of the spindle for expanding said shoes against the inner circumference of the drum.

2. Braking mechanism comprising a non-rotatable wheel spindle steerably pivoted at the end of a non-rotatable axle, a bearing at each end of said spindle, an enclosed rotatable brake drum having its closed ends supported on said bearings, an axle member having an arm extending radially therefrom keyed to said spindle between said bearings, an electro-magnet supported at the outer extremity of said arm having its armature operable at right angles to the axis of the axle member, a flange on said axle member, a brake shoe supporting plate secured to said flange, radially expansible brake shoes supported on said plate, and means whereby the movement of the armature expands said shoes into contact with the inner circumference of the said drum.

3. Braking mechanism comprising a non-rotatable wheel spindle having a shoulder at its inner end, two anti-friction bearings on said spindle, a spacing member between the inner races of said bearings, a nut threaded on the outer end of said spindle, said spacing member held against axial movement between said bearings by said shoulder and said nut and against rotation by keys on said spindle, radially expansible brake shoes and a brake shoe operating solenoid coil having its axis crosswise of the axis of the spindle supported by said spacing member, and a rotatable brake drum having both ends closed and a housing for one of said anti-friction bearings in each closed end surrounding the aforesaid mechanism.

4. Braking mechanism comprising a non-rotatable wheel spindle having a shouldered inner end, a threaded outer end and a multiple keyed middle portion, a correspondingly keyed spacing member between two anti-friction bearings on said spindle and held against said shoulder by a nut on said threaded end, expansible brake shoes, a brake shoe expanding cam and a cam operating electro-magnetic device supported against rotation about said spindle by attachment to said spacing member, a rotatable brake drum having both ends closed, and a housing for one of said anti-friction bearings in said closed end.

5. Braking mechanism comprising a non-rotatable wheel spindle having a shouldered inner end, a threaded outer end and a multiple keyed middle portion, a correspondingly keyed spacing member between two anti-friction bearings on said spindle and held against said shoulder by a nut on said threaded end, a closed drum rotatably mounted on said bearings, brake shoes and an electro-magnet supported against rotation within the drum enclosure by means extending from said spacing member, an armature adapted to be drawn within said electro-magnet to apply said brake shoes to said drum and resilient means adapted to return said armature to release said brake shoes from said drum.

6. Braking mechanism comprising a non-rotatable wheel spindle, a rotatable brake drum closed at the ends, a bearing in each closed end to support said drum for rotation about said wheel spindle, an axle member non-rotatably secured to said wheel spindle, a plate secured to said axle member having projections extending radially outward into the space within said drum, brake shoes and a brake shoe operating cam secured to one of said projections, a lever for operating said cam secured thereto, a spring secured to another of said projections and to said lever, an electro-magnet secured to another of said projections, and an armature operatively connected to said lever, said armature being adapted to be drawn into said magnet to operate said lever to apply the brake shoes, and said spring being adapted to return said lever to release said brake shoes.

VINCENT G. APPLE.